United States Patent Office 2,975,157
Patented Mar. 14, 1961

2,975,157

PRODUCTS FROM PIPERAZINE AND DIISOCYANATES

Manfred Katz, Wilmington, Del., assignor to E. I. du Pont de Nemours and Company, Wilmington, Del., a corporation of Delaware No Drawing. Filed July 25, 1957, Ser. No. 674,042

11 Claims. (Cl. 260—77.5)

This invention relates to a novel and useful high-melting soluble polyurea having fiber- and film-forming properties. More particularly, it relates to a polyurea formed from piperazine or a C-lower alkyl substituted piperazine and aromatic or alicyclic diisocyanates.

It is an object of the present invention to provide a high-melting, soluble, fiber- and film-forming polyurea. Another object is the preparation of a polyurea by a simple and fast process. A further object is to produce a polyurea in solution which is directly spinnable into orientable fibers or formable into other shaped articles such as films, rods, bristles, tubes, and the like. Other objects will appear hereinafter.

These objects are accomplished by the present invention which provides a polyurea containing the recurring structural unit:

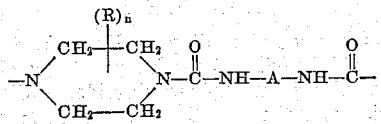

wherein R is a substituent for nuclear hydrogen and is lower alkyl, $n$ is an integer of from 0 to 8, and A is a divalent carbocyclic radical selected from the group consisting of a monocyclic and bicyclic group wherein the urea linkages are directly attached to a carbocyclic ring and the shortest chain between the said linkages contains a chain of at least 3 carbon atoms of one ring. The —A— radical may contain substituent groups such as lower alkyl, lower alkoxy and halogen. The resulting polyureas are all readily soluble in one or more of the following solvents: dimethylformamide, chloroform/trifluoroacetic acid (50/50), dimethylformamide containing 5% lithium chloride, 1,1,2-trichloroethane/formic acid (50/50), trifluoroacetic acid, dimethylacetamide containing 5% lithium chloride, or bromide or 5% calcium chloride, trifluoroacetic acid/nitrobenzene (50/50), trifluoroacetic acid/formic acid/1,1,2-trichloroethane (10/40/50) and from such solutions fibers, films, and various other articles can be shaped.

The polymers of the present invention are formed by reacting in a solvent, a piperazine compound of the formula

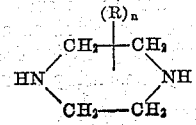

and a diisocyanate of the formula OCN—A—NCO wherein R, $n$, and A are as defined above, at a temperature of from about 0° C. to about 120° C. For this reaction, however, the total number of reactive amine groups should not differ from the total number of isocyanate groups by more than about 5%. The reaction is almost instantaneous and requires only a few seconds to a few minutes for substantial completion at any temperature between about 0° C. and 120° C.

The solvents which may be used for this reaction are any of those which are inert to the reactants and polymer, and will dissolve both reactants at the reaction temperature. Among the suitable solvents are dimethylformamide, chloroform, methylene chloride, benzene, 1,1,2-trichloroethane (hereinafter called trichloroethane), etc. In the preferred embodiment of the invention, the reaction is performed at room temperature with the reactants being dissolved in a solvent for the polymer to such an extent that the resulting polymer solution contains at least 5%, but preferably 20% to 30% or more, of the polymer and is suitable for the spinning of fibers or casting of films with little or no further concentration.

Mixtures of each of the two reactants (i.e., the diamine and/or diisocyanates) may also be employed in the reaction to form copolymers which correspond to the above formula but contain different recurring structural units. For instance, when one of the monomers is 2,5-dimethylpiperazine, 2,3,5,6-tetramethylpiperazine, etc., mixtures of the following diisocyanates may be used: bis(4 - isocyanatocyclohexyl)methane, methylene bis(4 - phenylisocyanate), biphenylene-4,4'-diisocyanate, 3,3'-dimethylbiphenylene-4,4'-diisocyanate, m-phenylenediisocyanate, 4-chloro-1,3-phenylene diisocyanate, 3,3'-dimethoxybiphenylene-4,4'-diisocyanate, etc. Similarly, when one of the monomers is bis(4-isocyanatocyclohexyl) methane, methylene bis(4-phenylisocyanate), etc. mixtures of the following piperazines may be used: 2,5-dimethylpiperazine, 2,3,5,6-tetramethylpiperazine, 2,6-dimethylpiperazine, 2,5-dipropylpiperazine, 2,5-diisobutylpiperazine, etc. Mixtures of both reactants may also be used for the formation of other copolyureas. When such mixtures of the diisocyanates and/or piperazines are used, however, the sum total of the reactive groups of the diisocyanate compounds should be substantially equal to the sum total of the reactive groups of the piperazine compounds (i.e., substantially equimolecular amounts of both reactants should be used). In addition, monomers or mixtures of monomers, such as hexamethylene diamine, ethylene diamine, hydrazine, benzidine, decamethylene diisocyanate, etc. may be substituted in amounts of up to about 20% for the piperazine and diisocyanate reactants of this invention. In the preferred embodiment of this invention, however, the polymer is composed solely of the aforementioned recurring structural units.

The invention is illustrated by the following examples in which the reactions are carried out at room temperature (unless otherwise stated), the inherent viscosities are measured at 25° C. and the given melting points indicate the lowest temperature at which a fresh polymer sample leaves a wet, molten trail as it is stroked with moderate pressure across a clean heated metal surface such as a brass block.

EXAMPLE 1

To a Waring Blendor is added 6.25 grams (0.025 mole) of methylene bis(4-phenylisocyanate) dissolved in 150 cc. of chloroform. To the stirred solution is added within about 10 seconds 2.85 grams (0.025 mole) of 2,5-dimethylpiperazine dissolved in 50 cc. of chloroform. The polymer precipitates from the solution and is isolated by filtration in a yield of 8.0 grams or 99.4% The polymer has an inherent viscosity of 1.3 in m-cresol and is soluble in both cold and hot dimethylformamide. It melts with decomposition at 350° C. The chloroform swollen filter cake of the polymer dissolves in formic acid to form a clear solution which is cast into a clear, flexible film.

The above example is repeated with the same ingredients. However, the precipitated polymer is not filtered off but put back in solution by the addition of 50 cc. of formic acid. The perfectly clear solution is useful for casting bubble-free films.

In a further variation of the above example, the volume of the liquid containing the precipitated polymer is reduced to about 20 cc. either by decantation or by removing some chloroform at reduced pressure. Addition of 20 cc. formic acid also produces a clear solution containing 20% solids. This solution can be cast into films or spun into textile denier fibers.

EXAMPLE 2

To a solution of 2.85 grams (0.025 mole) of 2,5-dimethylpiperazine in 30 cc. of dimethylformamide is added rapidly a solution of 6.25 grams (0.025 mole) of methylene bis(4-phenylisocyanate) in 30 cc. of dimethylformamide with stirring. A clear dope results almost immediately and a spinning solution having a concentration of about 15% is directly formed. A portion of the polymer is isolated from the solution by the addition of water, filtration, and drying. The polymer has an inherent viscosity of about 0.9 in m-cresol. To prevent cross-linkage within the polymer chains, the free isocyanate end groups of the polymer are converted into amino groups by boiling it in water for about 5 minutes. Without the isocyanate groups, no cross-linking of the polymer occurs even after prolonged heating.

The remaining solution is then jetted through a three-hole 0.08 mm. spinneret to form filaments by the conventional dry spinning procedure. The resulting yarn is extracted with water and drawn 2× in a steam tube at 40 p.s.i. steam pressure. The yarn has a sticking temperature of 244° C., a tenacity of 3.1 g.p.d. and an elongation of 22%. The hydrolytic stability of the yarn is excellent to alkali, as it is not affected by exposure to a 5% potassium hydroxide solution for 5 hours at 93° C. The stability to acid is also very good, the tenacity being reduced by only about 50% by 5 hours' exposure to 1% hydrochloric acid at 93° C.

EXAMPLE 3

222 grams of biphenylene-4,4'-diisocyanate is dissolved in 1000 ml. of dimethylformamide at 70° C. and placed in a large Waring Blendor. With vigorous stirring, a solution of 112.2 grams of 2,5-dimethylpiperazine in 1000 ml. of dimethylformamide at 70° C. is added. Polymerization proceeds rapidly to a clear, straw-colored gel; the temperature rises to about 90° C. Stirring is continued for five minutes. The gelled solution is held at 50–100° C. for some time in order to thermally degrade the polymer to the molecular weight at which it forms a clear gel-free solution (an inherent viscosity in dimethylformamide of 2.48 in this particular case). The solution is centrifuged to remove bubbles and transferred to a spinning cell held at 60° C.

Conventional dry spinning produces a yarn having a uniform cross-section, an inherent viscosity of 2.13 and the properties given in the table below.

Table

|  | As-spun | As-spun wet at 90° C. | Drawn 1.9× at 250° C. | Drawn 1.9× at 250° C., wet at 90° C. |
|---|---|---|---|---|
| Fiber stick temperature, ° C. | 244 |  | 255 |  |
| Tenacity (g.p.d.) | 2.7 | 1.0 | 3.0 | 1.5 |
| Elongation (percent) | 36 | 45 | 9.3 | 15 |
| Initial modulus (g.p.d.) | 52 | 21 | 83 | 42 |
| Work recovery at 3% (percent) | 48 |  | 46 |  |
| Tensile recovery at 5% (percent) | 71 |  | 62 |  |

EXAMPLE 4

2.85 grams (0.02 mole) of 2,2,5,5-tetramethylpiperazine dissolved in 40 cc. chloroform are stirred into a solution of 5.6 grams (0.02 mole) of 3,3'-dimethylbiphenylene-4,4'-diisocyanate in 120 cc. of chloroform. The polymer precipitates from the solution, is filtered, dried and dissolved in a mixture of trichloroethane/formic acid 50/50 to give a clear solution which is cast into a drawable film. The polymer melts at 220° C. and has an inherent viscosity of 0.80 in m-cresol.

This polymer, dissolved in a 40/60 mixture of methylene chloride/formic acid, is spun into fibers by the conventional dry spinning process. It produces a filament having a tenacity of 0.9 g.p.d. and an elongation of 30%.

A filament of the same polymer, spun from a 60/40 mixture of chloroform/formic acid, also shows a tenacity of 0.9 g.p.d. Its elongation and initial modulus are found to be strongly dependent on its molecular weight distribution since this fiber sample having an elongation of 18% and an initial modulus of 38 g.p.d. after extracting for 2 hours in boiling water has an elongation of 3.3% and an initial modulus of 49 g.p.d.

EXAMPLE 5

A polymer made according to Example 4 but with 3,3'-dimethylbiphenylene-4,4'-diisocyanate and 2,5-dimethylpiperazine in methylene chloride, is dissolved in formic acid, and the resulting viscous dope spun into fibers with the following properties:

Tenacity _____ g.p.d.___ 1.9
Elongation _____ percent__ 11
Initial modulus _____ g.p.d.___ 54

The same polymer spun from trichloroethane-formic acid (50/50) gives the following as-spun properties:

Tenacity _____ g.p.d.___ 2.0
Elongation _____ percent__ 15
Initial modulus _____ g.p.d.___ 63

The polymer spun from a 50/50 mixture of chloroform/formic acid produces the following characteristics:

Tenacity _____ g.p.d.___ 1.5
Elongation _____ percent__ 10
Initial modulus _____ g.p.d.___ 65

EXAMPLES 6 to 29

The following polymers were prepared according to the procedure of the reference examples above. All of the polymers were found to be soluble in the indicated solvent in sufficient concentration so as to spin filaments or cast films. The values given for the inherent viscosity are those obtained by measuring it in concentrated sulfuric acid at 25° C.

| Example | Reference Example | Polymer Melt Temp. | Inherent Viscosity | Solvent | Ratio |
|---|---|---|---|---|---|
| 6. biphenylene-4,4'-diisocyanate piperazine. | 4 | 386 | 2.1 | formic acid/nitrobenzene | 1:1 |
| 7. 3,3'-dimethylbiphenylene-4,4'-diisocyanate piperazine. | 4 | 342 | 2.16 | ___do___ | 1:1 |
| 8. 3,3'-dimethylbiphenylene-4,4'-diisocyanate 2-methylpiperazine. | 2 | 342 | 1.25 | dimethylformamide/lithium chloride. | 19:1 |
| 9. 3,3'-dimethoxybiphenylene-4,4'-diisocyanate 2-methylpiperazine. | 4 | 362 | 0.62 | trichloroethane/formic acid | 1:1 |
| 10. 3,3'-dimethoxybiphenylene-4,4'-diisocyanate 2,5-dimethylpiperazine. | 4 | 376 | 0.81 | ___do___ | 1:1 |
| 11. 4-methylphenylene-1,3-diisocyanate 2,5-dimethylpiperazine. | 4 | 345 | 1.16 | dimethylformamide/lithium | 19:1 |
| 12. 3,3'-dimethoxybiphenylene-4,4'-diisocyanate piperazine. | 4 | 376 | 1.15 | hot trichloroethane/formic acid. | 1:1 |
| 13. 2,4,6-trimethylphenylene-1,3-diisocyanate piperazine. | 4 | 400 | 0.41 | ___do___ | 1:1 |
| 14. p-phenylene-diisocyanate 2,2,5,5-tetramethylpiperazine. | 4 | 316 | 0.70 | ___do___ | 1:1 |
| 15. m-phenylene-diisocyanate 2,5-dimethylpiperazine. | 2 | 325 | | dimethylformamide | |
| 16. 4-methylphenylene-1,3-diisocyanate 2-methylpiperazine. | 4 | 355 | 0.63 | hot trichloroethane/formic acid. | 1:1 |
| 17. biphenylene-4,4'-diisocyanate 2,6-dimethylpiperazine. | 2 | 325 | 0.21 | dimethylformamide | |
| 18. biphenylene-4,4'-diisocyanate 2,3,5,6-tetramethylpiperazine. | 2 | 245 | 0.35 | ___do___ | |
| 19. bis(4-isocyanatocyclohexyl)methane 2,5-dimethylpiperazine. | 4 | 291 | 1.0 | trichloroethane/formic acid | 1:1 |
| 20. p-cyclohexylene-diisocyanate piperazine. | 4 | 324 | 0.60 | ___do___ | 1:1 |
| 21. 2,4,6-trimethylphenylene-1,3-diisocyanate 2,5-dimethyl piperazine. | 4 | [1] 335 | 0.33 | ___do___ | 1:1 |
| 22. biphenylene-4,4'-diisocyanate 2,2,5,5-tetramethyl piperazine. | 4 | 312 | 0.80 | ___do___ | 1:1 |
| 23. p-phenylene-diisocyanate 2,5-dimethyl piperazine. | 4 | 376 | 0.56 | trifluoroacetic acid/nitrobenzene. | 1:1 |
| 24. 2,3,5,6-tetramethylphenylene-1,4-diisocyanate 2,5-dimethyl piperazine. | 4 | 390 | 0.36 | ___do___ | 1:1 |
| 25. p-cyclohexylene diisocyanate 2,2,5,5-tetramethylpiperazine. | 4 | 390 | 0.54 | trichloroethane/formic acid | 1:1 |
| 26. p-cyclohexylene diisocyanate 2,5-dimethyl piperazine. | 4 | 390 | 0.48 | ___do___ | 1:1 |
| 27. 1,2-bis(4-isocyanatophenyl)ethane 2,5-dimethyl piperazine. | 4 | [1] 362 | 0.33 | ___do___ | 1:1 |
| 28. biphenylene-4,4'-diisocyanate 2-methyl piperazine. | 1 | 386 | 1.82 | hot trichloroethane/formic acid. | 1:1 |
| 29. 4-methylphenylene-1,3-diisocyanate piperazine | 4 | 295 | 0.51 | trichloroethane/formic acid | 1:1 |

[1] Decomposes.

Other diisocyanates that may replace those given in the examples are naphthalene-1,3-diisocyanate, naphthalene-2,6-diisocyanate, 4-chlorophenylene-1,3-diisocyanate, bicyclohexylene-4,4'-diisocyanate, 2,2-bis(4-isocyanatophenyl)pentane, 3,3'-dichlorobiphenylene-4,4'-diisocyanate, etc. The preferred diisocyanates, however, are those which contain not more than about 20 carbon atoms. As particular examples of other diamines, there may be mentioned 2,6-diethylpiperazine, 2-ethylpiperazine, 2,5-diisobutylpiperazine, 2,2,3,3,5,5,6,6-octamethylpiperazine, 2,3,5,6-tetrapropylpiperazine, etc.

When the polymers of the present invention are formed by using equimolecular proportions of both reactants or a slight excess of the diisocyanates, there still remains on the polymer molecule terminal isocyanate groups. When these polymers are stored in solution for extended periods of time, and particularly when stored at higher temperatures, some undesirable cross-linking takes place because of the reactive isocyanate end groups. As shown by Example 2, this undesirable cross-linking can be avoided by merely treating the polymer with boiling water for a period of between about 5 and about 60 minutes. Similar effects are also obtainable by treatment with other chain-terminating agents such as monoamines, alcohols, etc. In some instances, however, the polymer is formed in solution at room temperature and since the solution is used rather quickly, little or no undesirable cross-linking takes place. The treatment with such agents therefore is generally employed only when the polymer is to be stored for some time before it is to be used.

One advantage of the polymers of this invention is their solubility since polyureas generally are insoluble in neutral solvents and can be wet-spun only from strongly acid spin dopes. Use can be made of the surprising solubility of these polymers in the described solvents, by making shaped articles without first separating the polymers and redissolving them in a different solvent. In some instances, the polymers may be prepared in a liquid which dissolves the reactants but not the polymer and the polymer then put in solution by the addition of a second liquid as shown in Example 1. As is also shown by the examples, fibers may be formed from the preparation solutions by the use of conventional dry-spinning procedures wherein the solution is extruded through a mono- or multi-hole spinneret into a heated atmosphere. The preparation, of course, can be done in a continuous manner, e.g., by combining the two monomer solutions at one end of the polymerization vessel and spinning the fiber continuously through a spinneret at the other end to which the viscous solution is forwarded by mechanical means.

The new polymers have fiber- and film-forming properties and are high to very high melting. In addition these polymers show good to outstanding as-spun physical properties. The importance of these properties is well recognized in the synthetic textile trade. The solubility of these new polyureas makes their preparation faster, simpler, and more economical. Among the utilities for these new fibers and other shaped articles and structures produced from the polymers, only a few are mentioned to illustrate their usefulness in the many and various fields: clothing, sewing threads, press pad covers, brushes, reinforcements for plastics and papers, and other uses where high sticking temperatures and toughness are required such as in woven and non-woven filter cloths for corrosive liquids at high temperatures, etc.

A dyestuff or pigment may also be mixed into the polymer solution in order to produce colored structures.

Many modifications will be apparent to those skilled in the art from the reading of the above without a departure from the inventive concept.

I claim:

1. A synthetic fiber-forming polyurea having a melting point of at least about 325° C. and consisting essentially of the recurring structural units

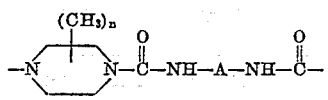

wherein $n$ is a whole integer of from 1 to 2, inclusive, and A is a divalent hydrocarbon radical selected from the group consisting of a monocyclic and bicyclic aromatic radical of from 7 to 14 carbon atoms, inclusive, with the

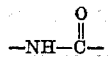

groups being directly attached to an aromatic ring and the shortest chain between the

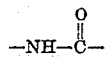

linkages being a chain of at least three carbon atoms of one ring.

2. The polyurea of claim 1 wherein $n$ is 1 and A is the biphenylene radical.
3. The polyurea of claim 1 wherein $n$ is 2 and A is the biphenylene radical.
4. The polyurea of claim 1 wherein $n$ is 2 and A is the dimethyl biphenylene radical.
5. The polyurea of claim 1 wherein $n$ is 2 and A is the biphenylene methyl radical.
6. A process for the formation of a synthetic fiber-forming polyurea having a melting point of at least about 325° C. and consisting essentially of the recurring structural units

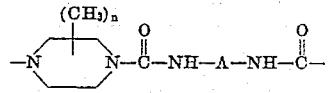

which comprises reacting at a temperature of from about 0° C. to 120° C. in an inert solvent for the reactants, a piperazine compound of the formula

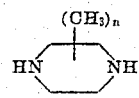

and a diisocyanate of the formula

OCH-A-NCO wherein $n$ is a whole integer of from 1 to 2, inclusive, and A is a divalent hydrocarbon radical selected from the group consisting of a monocyclic and bicyclic aromatic radical of from 7 to 14 carbon atoms, inclusive, with the

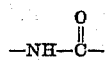

groups being directly attached to an aromatic ring and the shortest chain between the

linkages being a chain of at least three carbon atoms of one ring.

7. A fiber-forming polyurea having a melting point of at least about 325° C. and consisting essentially of the recurring structural unit

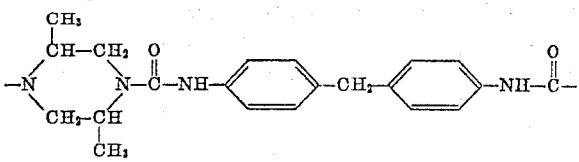

8. A fiber-forming polyurea having a melting point of at least about 325° C. and consisting essentially of the recurring structural unit

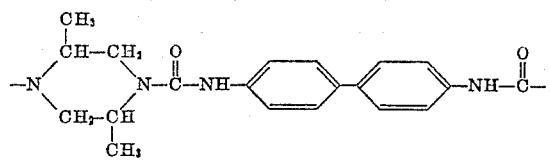

9. A fiber-forming polyurea having a melting point of at least about 325° C. and consisting essentially of the recurring structural unit

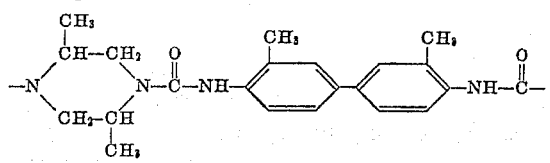

10. The process of claim 6 wherein the reaction is carried out at room temperature.
11. The process of claim 6 wherein the reaction solvent is dimethylformamide.

References Cited in the file of this patent

UNITED STATES PATENTS

| | | |
|---|---|---|
| 2,284,896 | Hanford et al. | June 2, 1942 |
| 2,708,617 | Magat et al. | May 17, 1955 |
| 2,801,990 | Seeger et al. | Aug. 6, 1957 |
| 2,813,775 | Steuber | Nov. 19, 1957 |

FOREIGN PATENTS

| | | |
|---|---|---|
| 779,806 | Great Britain | July 24, 1957 |
| 898,966 | Germany | Dec. 7, 1953 |
| 919,912 | Germany | Nov. 8, 1954 |
| 114,419 | Sweden | July 3, 1945 |
| 1,123,599 | France | June 11, 1956 |

OTHER REFERENCES

Lieser et al.: Liebig's Annalen der Chemie, vol. 548, pp. 226–254 (1941).